(12) United States Patent
Fetterman, III et al.

(10) Patent No.: US 8,388,836 B1
(45) Date of Patent: Mar. 5, 2013

(54) WASTE SEPARATOR APPARATUS AND SYSTEM FOR TREATING ANIMAL WASTE AND THE LIKE

(75) Inventors: Lewis Morris Fetterman, III, Clinton, NC (US); Durwood Nelson Renfrow, Clinton, NC (US); James Eulen Sinclair, Jr., Clinton, NC (US); Angela Denise Schroeder, Clinton, NC (US); Claude Decator Pyatte, Jr., Clinton, NC (US)

(73) Assignee: Emerald Waste Solutions, LLC, Clinton, NC (US)

( * ) Notice: Subject to any disclaimer, the term of this patent is extended or adjusted under 35 U.S.C. 154(b) by 0 days.

(21) Appl. No.: 13/603,462

(22) Filed: Sep. 5, 2012

(51) Int. Cl.
*B01D 33/06* (2006.01)
*B01D 33/46* (2006.01)
*B01D 29/64* (2006.01)

(52) U.S. Cl. ............... 210/170.01; 210/258; 210/259; 210/332; 210/342; 210/397; 210/403; 210/414; 210/415; 100/117; 100/145

(58) Field of Classification Search .......... 210/258, 210/259, 332, 338, 342, 346, 391, 396, 397, 210/402, 403, 414, 415, 416.1, 170.01; 100/117, 100/145
See application file for complete search history.

(56) References Cited

U.S. PATENT DOCUMENTS

| | | | | |
|---|---|---|---|---|
| 1,354,528 | A * | 10/1920 | Wertenbruch | 100/117 |
| 2,664,814 | A * | 1/1954 | Ahlborn | 100/117 |
| 3,478,679 | A * | 11/1969 | Bauserman | 100/117 |
| 4,085,050 | A * | 4/1978 | Gervasi | 210/332 |
| 4,772,307 | A | 9/1988 | Kiss et al. | |
| 4,871,449 | A * | 10/1989 | Lott | 210/415 |
| 5,433,849 | A * | 7/1995 | Zittel | 210/342 |
| 5,643,458 | A * | 7/1997 | Nagaoka | 210/342 |
| 6,436,290 | B1 * | 8/2002 | Glassford | 210/416.1 |
| 6,464,884 | B1 * | 10/2002 | Gadgil | 210/416.1 |
| 6,893,567 | B1 | 5/2005 | Vanotti et al. | |
| 7,674,379 | B2 | 3/2010 | Vanotti et al. | |
| 2003/0141245 | A1 | 7/2003 | Fetterman et al. | |
| 2010/0314304 | A1 * | 12/2010 | Tapp | 210/151 |

* cited by examiner

*Primary Examiner* — Christopher Upton
(74) *Attorney, Agent, or Firm* — Olive Law Group, PLLC

(57) ABSTRACT

A waste separator apparatus is provided. The apparatus includes a first screen assembly for screening fluids from a waste stream where the first screen assembly defining an enclosure. A second screen assembly is provided for screening fluids from the waste stream and is disposed closely spaced-apart within the enclosure of the first screen assembly. A waste stream pathway is defined between the first screen assembly and the second screen assembly. A first separated fluids stream pathway is defined outwardly of the first screen assembly. A second separated fluids stream pathway is defined inwardly of the second screen assembly. One or more blades extends inwardly from the first screen assembly or outwardly from the second screen assembly for advancing the waste stream through the waste stream pathway. A related system is also provided.

28 Claims, 9 Drawing Sheets

WASTE SEPARATOR APPARATUS AND SYSTEM FOR TREATING ANIMAL WASTE AND THE LIKE

TECHNICAL FIELD

This disclosure is related to an apparatus and related system for treating animal waste and the like, and, more particularly, towards an apparatus and related system for treating animal waste such as, for example, swine waste into a solid waste stream and a liquid waste stream.

BACKGROUND

Commercialization of swine farming has led to issues involving treatment of the swine waste. Specifically, swine are typically enclosed at a farm site in a relatively dense population. Waste is removed from the site by washing waste that has accumulated within channels cut into the farm site floor. The waste and water mixture is then collected at a downstream site and is deposited into a lagoon or sprayed onto a field as fertilizer.

The lagoon acts as a bio-reactive system that treats the waste through the reaction of bio-reactive material and enzymes. Nitrogen and other material levels must be carefully monitored in the lagoon and in any waste that is sprayed on a field as a fertilizer. Swine waste is inherently high in nitrogen content and some plants are unable to properly process the high-nitrogen level, so further processing may be required of waste before it can be applied as a fertilizer.

The use and placement of waste lagoons has been problematic in recent years. As residential and commercial establishments have begun to encroach on lagoons, residents and consumers have complained about the odors associated with lagoons. Furthermore, in situations of extreme and significant rainfall, lagoons have overfilled and overrun into the surrounding landscape. This has resulted in damage to existing crop structures, soil, water, and sewer systems of the surrounding landscape. These problems have been further exacerbated by legislation restricting the building of new swine lagoons. This has caused swine farmers to determine new manners of maximizing the capacity of already-built swine lagoons.

A need therefore exists for a method or solution that addresses these disadvantages.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is a waste separator apparatus. The apparatus includes a first screen assembly for screening fluids from a waste stream, the first screen assembly defining an enclosure and a second screen assembly for screening fluids from the waste stream and being disposed closely spaced-apart within the enclosure of the first screen assembly. A waste stream pathway is defined between the first screen assembly and the second screen assembly. A first separated fluids stream pathway is defined outwardly of the first screen assembly. A second separated fluids stream pathway is defined inwardly of the second screen assembly. One or more blades extend inwardly from the first screen assembly or outwardly from the second screen assembly for advancing the waste stream through the waste stream pathway.

According to one or more embodiments, the apparatus includes a housing for enclosing the first screen assembly and the second screen assembly.

According to one or more embodiments, the apparatus includes a pump for pumping the waste stream to the waste separator apparatus.

According to one or more embodiments, the pump is a progressive cavity pump.

According to one or more embodiments, the first screen assembly is cylindrically shaped and having a diameter of about 11 inches and the second screen assembly is cylindrically shaped and having a diameter of about 8 inches. The first screen assembly and the second screen assembly are coaxially aligned.

According to one or more embodiments, the apparatus further includes a vacuum source in communication with at least one of the first separated fluids stream pathway and the second separated fluids stream pathway.

According to one or more embodiments, the one or more blades comprises an auger blade that defines a helical plane extending from about a bottom portion of the second screen assembly to about a top portion of the second screen assembly.

According to one or more embodiments, the auger blade further includes a sealing layer on a peripheral surface thereof for maintaining engagement with the first screen assembly.

According to one or more embodiments, the apparatus includes at least one device configured for rotating at least one of the first screen assembly and the second screen assembly.

According to one or more embodiments, the first screen assembly and the second screen assembly defines a wedge wire mesh having about a twenty-thousandths clearance.

According to one or more embodiments, the apparatus includes a conveyor at a top portion in communication with the waste stream pathway for conveying separated waste away from the apparatus.

According to one or more embodiments, a system for treating a waste fluid stream is provided. The system includes a waste site having the waste fluid stream output and a waste separator apparatus configured for separating the waste fluid stream into respective separated fluid streams. The waste separator apparatus includes a first screen assembly for screening fluids from a waste stream with the first screen assembly defining an enclosure. A second screen assembly for screening fluids from the waste stream is disposed closely spaced-apart within the enclosure of the first screen assembly. A waste stream pathway is defined between the first screen assembly and the second screen assembly. A first separated fluids stream pathway is defined outwardly of the first screen assembly. A second separated fluids stream pathway is defined inwardly of the second screen assembly. One or more blades extend inwardly from the first screen assembly or outwardly from the second screen assembly for advancing the waste stream through the waste stream pathway. A downstream processing unit is configured for further processing of one of the separated fluid streams.

According to one or more embodiments, the system includes a homogenization tank between the waste site and the waste separator apparatus.

According to one or more embodiments, the system includes one of a denitrification and a nitrification unit in communication with the system.

According to one or more embodiments, the waste site is a livestock farm.

According to one or more embodiments, the system includes a lagoon for storing separated liquids.

According to one or more embodiments, the apparatus further includes a housing for enclosing the first screen assembly and the second screen assembly.

According to one or more embodiments, the system includes a pump for pumping the waste stream to the waste separator apparatus.

According to one or more embodiments, the separator apparatus further includes a vacuum source in communication with at least one of the first separated fluids stream pathway and the second separated fluids stream pathway.

According to one or more embodiments, the one or more blades comprises an auger blade that defines a helical plane extending from about a bottom portion of the second screen assembly to about a top portion of the second screen assembly.

According to one or more embodiments, the auger blade includes a guide surface on a peripheral surface thereof for maintaining engagement with the first screen assembly.

According to one or more embodiments, the apparatus further includes at least one device configured for rotating at least one of the first screen assembly and the second screen assembly.

According to one or more embodiments, the first screen assembly and the second screen assembly defines a wedge wire mesh having about a twenty-thousandths clearance.

According to one or more embodiments, the system includes a conveyor at a top portion in communication with the waste stream pathway for conveying separated waste away from the apparatus.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

Figure 1:
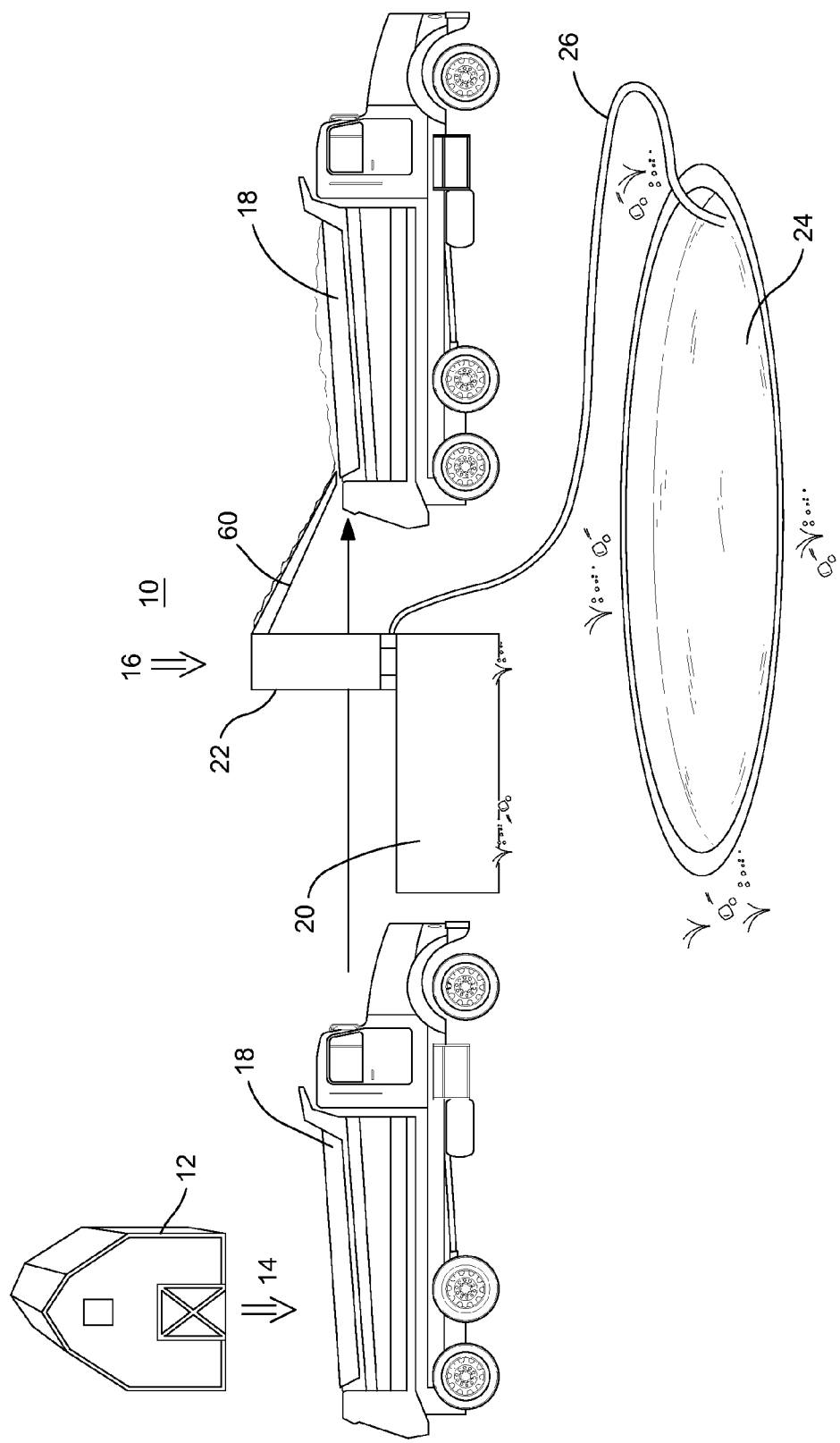
FIG. 1 is a schematic illustration of a system for treating animal waste according to one or more embodiments disclosed herein.

FIG. 1 is a schematic illustration of a system for treating animal waste according to one or more embodiments disclosed herein. The system is generally designated 10. The system 10 may include a waste site 12. The waste site 12 may be a swine house or similar. Alternatively, the waste site 12 may be any other site that has a waste fluid stream output 14. The waste fluid stream output 14 may be transported to a waste separator assembly 16 by any appropriate manner. For example, in the schematic illustrated in FIG. 1, a transport vehicle 18 may be employed. The transport vehicle 18 may further dispose of the waste into a pump assembly 20 such as, for example, a progressive cavity pump that is configured for conveying the waste material to a waste separator apparatus 22. After processing in the waste separator apparatus 22, the separated wastes are then transported to an additional site. In the schematic illustrated in FIG. 1, the additional site may include a lagoon 24 that is in communication with the waste separator apparatus 22 by a hose 26. The lagoon 24 may be optimally configured for receiving predominately liquid wastes. Solid wastes may be transported by the transport vehicle 18 for further processing or storage.

Figure 2:
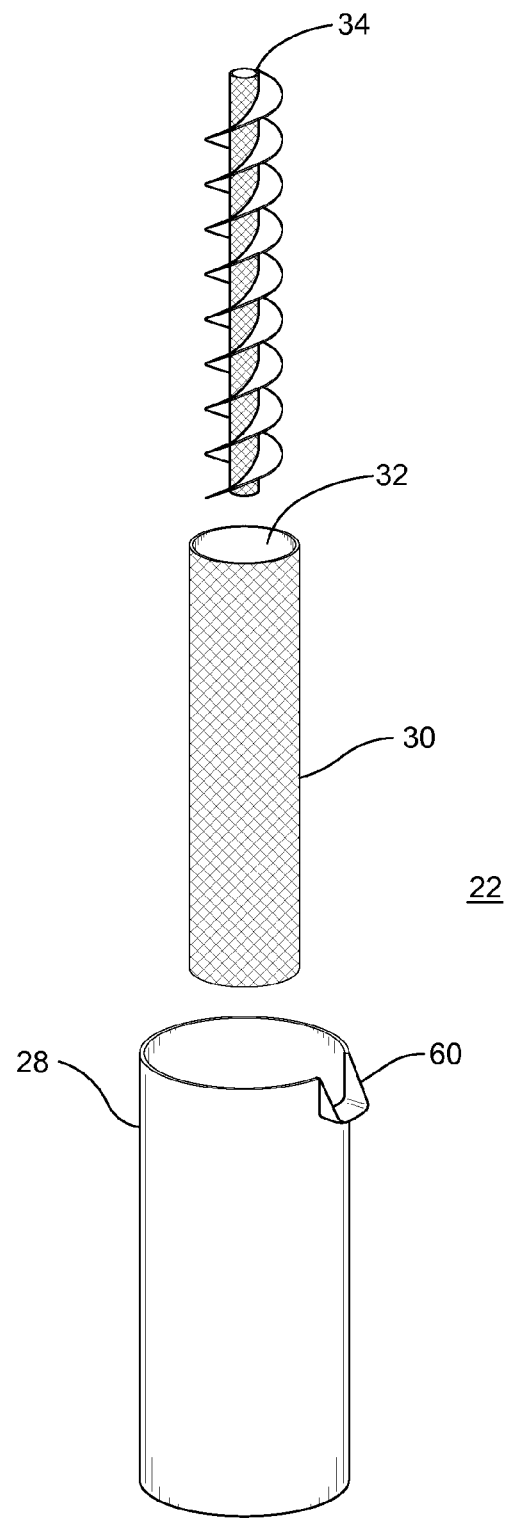
FIG. 2 is an exploded view of a waste separator apparatus for treating animal waste according to one or more embodiments disclosed herein.

FIG. 2 illustrates an exploded view of the waste separator apparatus 22. The waste separator apparatus 22 is optimally configured for separating the waste fluid stream into respective separated fluid streams, with one fluid stream being predominately separated liquids and another fluid stream being predominately separated solids. The waste separator apparatus 22 includes a first screen assembly 30 for screening fluids from a waste stream. The first screen assembly 30 defines an enclosure 32 therein. In one or more embodiments, the first screen assembly 32 has an inner diameter of approximately 11 inches, though any appropriately configured size may be employed. The apparatus 22 may include a second screen assembly 34 for screening fluids from the waste stream and being disposed closely spaced-apart within the enclosure 32 of the first screen assembly 30. The apparatus 22 may further include a housing 28 for enclosing the first screen assembly 30 and the second screen assembly 34. First screen assembly 30 and second screen assembly 34 may be a wedge wire mesh having about a twenty-thousandths clearance.

Figure 3:
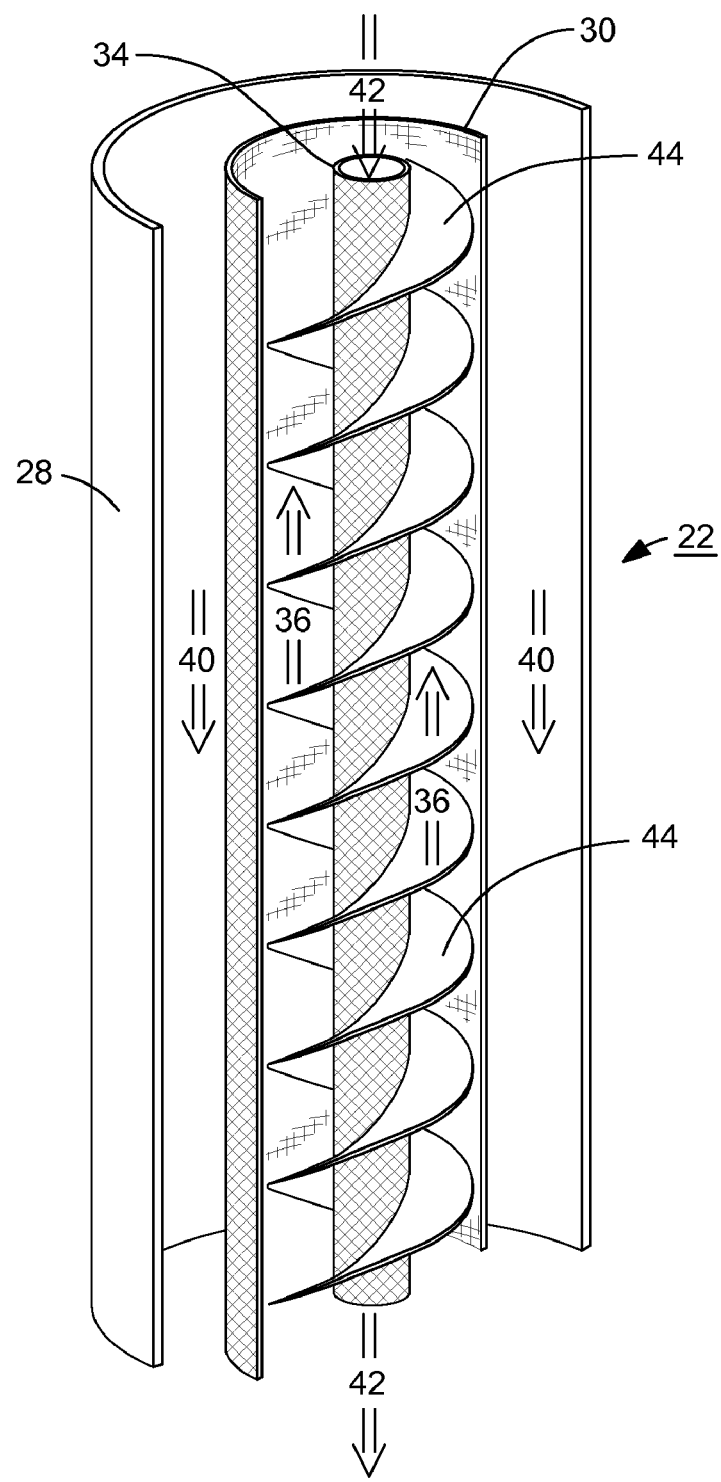
FIG. 3 is a partial sectional view of a waste separator apparatus for treating animal waste according to one or more embodiments disclosed herein.
Figure 4:
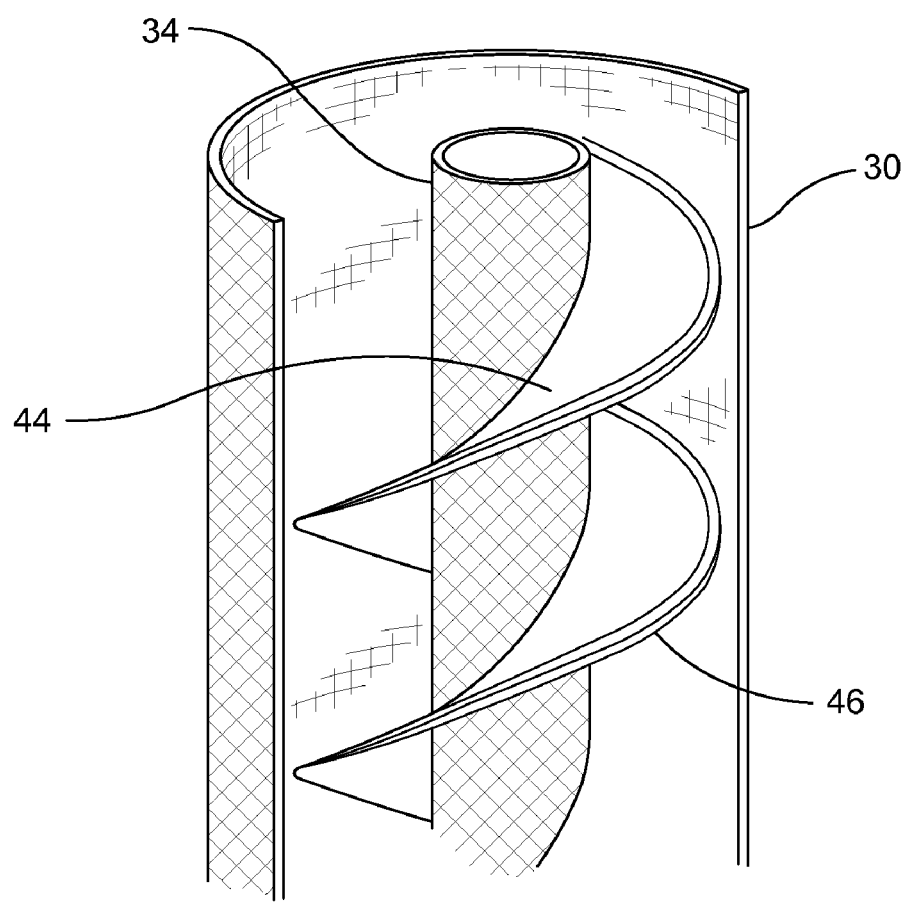
FIG. 4 is an enlarged sectional view of a waste separator apparatus for treating animal waste according to one or more embodiments disclosed herein.

With reference to FIG. 3, a waste stream pathway 36 is defined between the first screen assembly 30 and the second screen assembly 34. A first separated fluids stream pathway 40 is defined outwardly of the first screen assembly 30. A second separated fluids stream pathway 42 is defined inwardly of the second screen assembly 30. One or more blades 44 extend outwardly from the second screen assembly 34 for advancing the waste stream through the waste stream pathway 36. The one or more blades 44 may be an auger blade assembly as illustrated that is configured for advancing the waste stream through the apparatus 22. The one or more blades 44 may be configured to within a finitely close orientation relative to the inner facing portion of the first screen assembly 30. As illustrated in FIG. 4, in one or more embodiments, a sealing layer 46 may be provided on a peripheral portion of the auger blades 44 for providing sealable engagement with the first screen assembly 30. The sealing layer 46 may be a polymer or other appropriately configured material.

Figure 5:
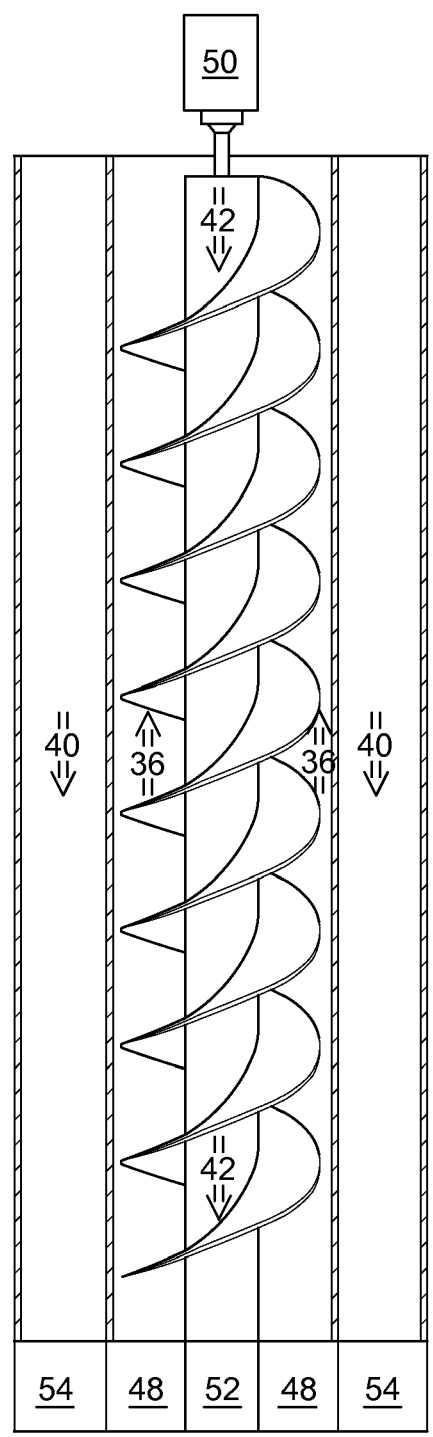
FIG. 5 is a cross-sectional view of a waste separator apparatus for treating animal waste according to one or more embodiments disclosed herein.

As illustrated in FIG. 5, a motor or other assembly 50 may be provided for rotating the second screen assembly 34 to thereby impart rotation of the one or more blades 44. In this manner, the second screen assembly 34 and the one or more blades 44 may be integrally formed or otherwise coupled together. Alternatively, the second screen assembly 34 and the one or more blades may not be integrally formed and otherwise coupled together such that rotation of the one or more blades 44 may occur while the second screen assembly 34 remains stationary. A vacuum or negative pressure source 52 may be provided that is in communication with the second separated fluids stream pathway 42. In this manner, the vacuum 52 may be provided to induce a pressure bias for separating fluids from the waste stream pathway 36.

Similarly, a vacuum 54 may be provided that is in communication with the first separated fluids stream pathway 40 for also inducing a pressure bias for separating fluids from the first separated fluids stream pathway 40. Additionally, a low pressure source 48 may be provided in communication with the waste stream pathway 36 for providing a pressure bias to force separated liquids into one of the first separated fluids stream pathway 40 and the second separated fluids stream pathway 42. The low pressure source 48 may be, for example, a compressed air source of about ten (10) pounds per square inch.

In one or more embodiments, the first screen assembly 30 is cylindrically shaped and has an inner diameter of about 11 inches. In one or more embodiments, the second screen assembly 34 is cylindrically shaped and has an outer diameter of about 8 inches. In this manner, the waste stream pathway 36 has a spacing of approximately one and one half inches (1.5) between the first screen assembly 30 and the second screen assembly 34. In one or more embodiments, the first screen assembly 30 and the second screen assembly 34 may be coaxially aligned. Each of the first screen assembly 30 and the second screen assembly 34 may be formed from a wedge-wire construction having about a twenty-thousandths clearance between adjacent wires.

A conveyor assembly 60 may be provided in communication with the waste stream pathway 36 for transporting the processed waste to an additional processing site. A chute is illustrated in FIG. 2 as one example of conveyor assembly 60, though any appropriately configured conveyor may be utilized.

Figure 6:
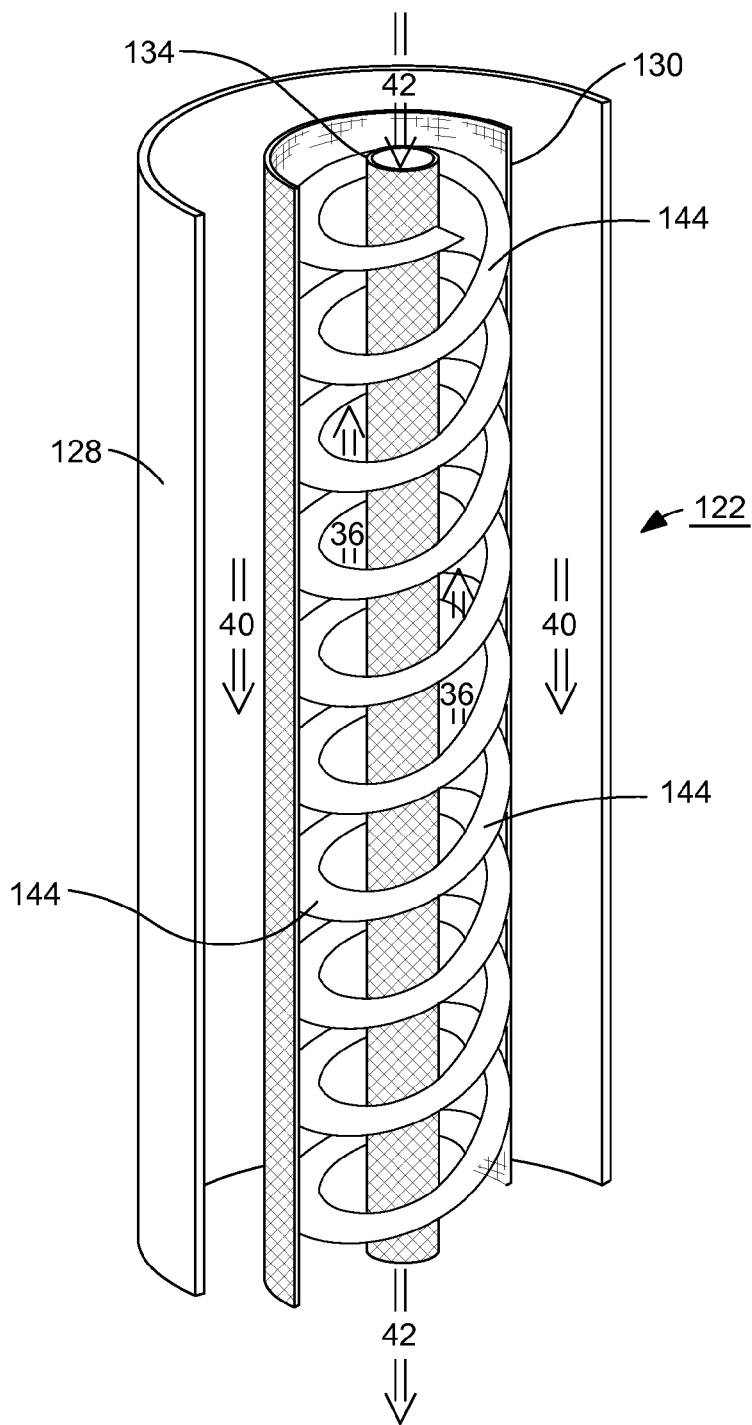
FIG. 6 is a partial perspective view of a waste separator apparatus for treating animal waste according to one or more embodiments disclosed herein.

An alternate embodiment of a waste separator apparatus is illustrated in FIG. 6 and generally designated 122. The waste separator apparatus 122 includes many common elements with waste separator apparatus 22. For example, the waste separator apparatus 122 includes a first screen assembly 130 and a second screen assembly 134. One or more blades 144 extend from the first screen assembly 130 towards the second screen assembly 134. A housing 128 is provided for enclosing the first screen assembly 130 and the second screen assembly 132. Fluid paths 36, 40, and 42 are defined similar to those depicted in FIG. 2. Apparatus 122 operates in a similar function to apparatus 22 with the exception of blades 144 extending inwardly from the first screen assembly 130.

Figure 7:
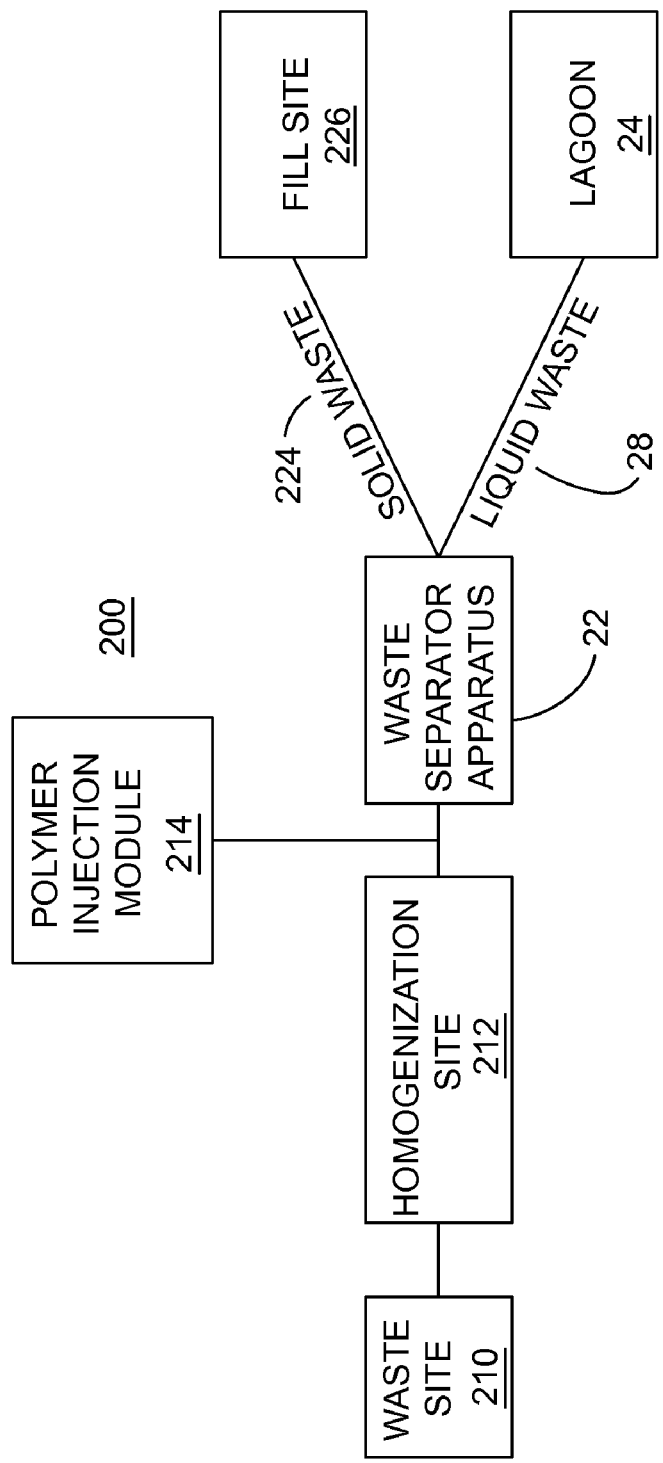
FIG. 7 is a schematic illustration of a waste separator system for treating animal waste according to one or more embodiments disclosed herein.

FIG. 7 illustrates a schematic flow-chart showing one or more systems that may be employed with the apparatus 22 provided herein. The system 200 may include a waste site 210 that may be, for example, a swine site or other as described with relation to system 10 illustrated in FIG. 1. The system 200 may further include a homogenization site 212. The homogenization site 212 may include a mixer, strainer tank or similar configured for creating a generally uniform outlet waste stream. A polymer injection unit 214 may also be provided in which polyacrylamide (PAM) polymer flocculant is injected into the waste stream to act as a binder for removing additional solids from the waste stream. A nitrification or denitrification unit may also be employed either upstream or downstream of the polymer injection unit 214. The waste separator apparatus 22 then processes the waste into respective waste streams, with a solid waste stream 224 being taken to a fill site 226 or similar and a liquid waste stream 228 being transported to the lagoon 24.

Figure 8A:
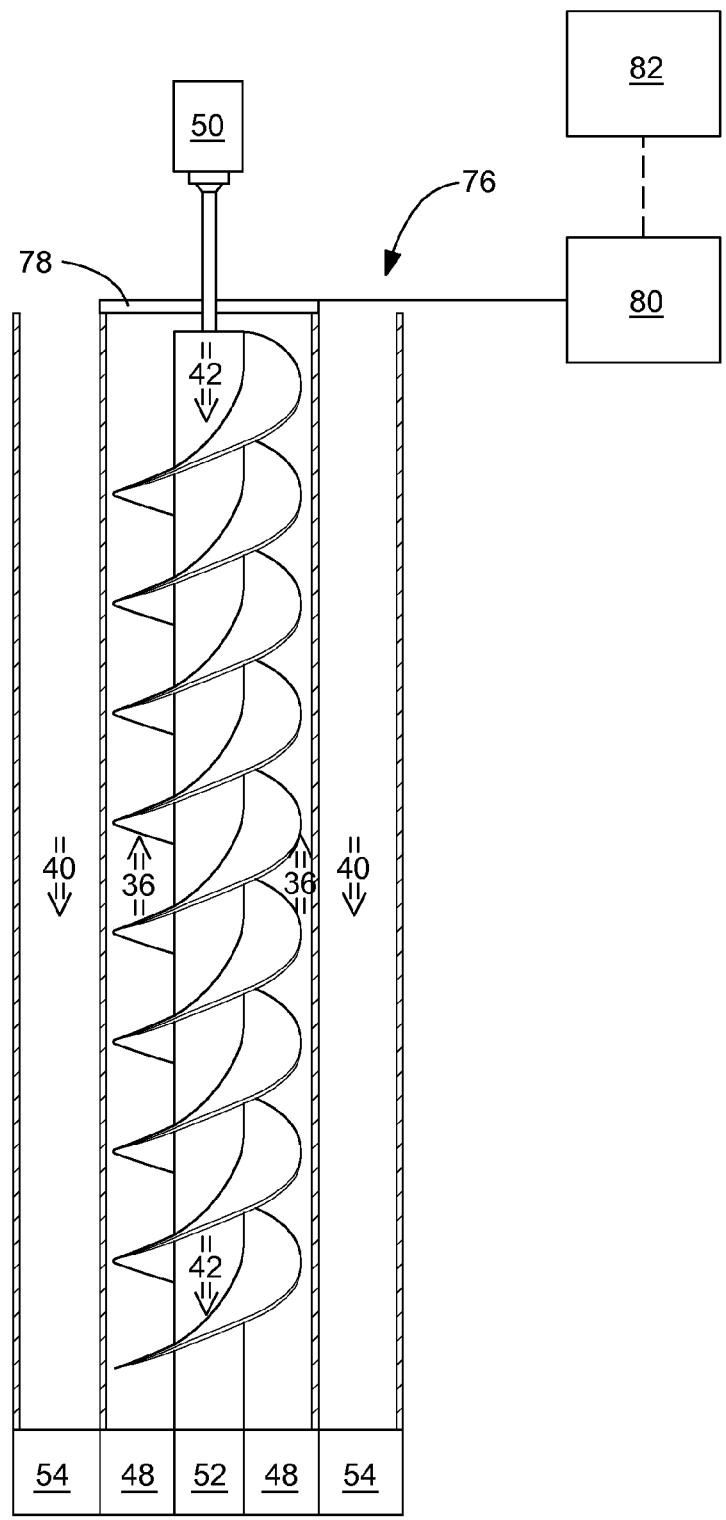
FIGS. 8A and 8B are cross-sectional, schematic views of a waste separator apparatus for treating animal waste according to one or more embodiments disclosed herein.
Figure 8B:
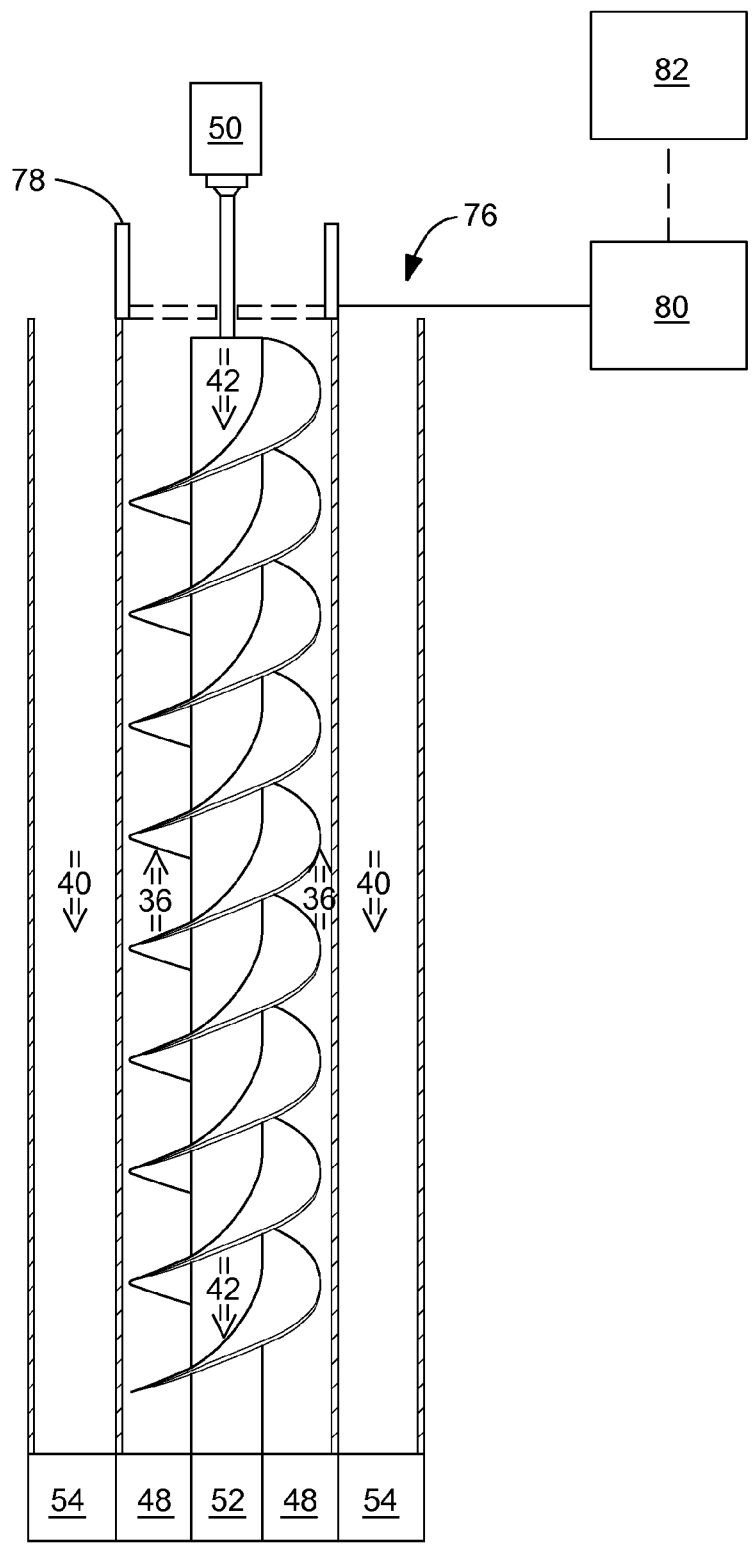

As illustrated with further reference to FIGS. 8A and 8B, a pneumatic restriction system 76 may be employed in combination with the waste separator apparatus 10. The pneumatic restriction system 76 may include a restrictor gate 78 that is configured for being a first, closed position as illustrated in FIG. 8A and a second, open position as illustrated in FIG. 8B. The restrictor gate 78 may be controlled by an actuator 80. Actuator 80 may be a pneumatic actuator in one or more embodiments, and, may alternatively be an electric, mechanical, or other appropriately configured actuator. A control module 82 may be provided in communication with the actuator 80 and configured for providing controls to actuate the actuator 80. In this manner, the pneumatic restriction system 76 is configured for closing off a top portion of the waste stream pathway 36 in order to provide for a buildup of pressure as additional waste fluids are injected into the apparatus 10. In this manner, the control module 82 may include a sensor that is configured for detecting a pressure, weight, or similar within the waste stream pathway 36 and may instruct the actuator 80 to open the restrictor gate 78 upon reaching a desired pressure, weight, or similar. Then waste stream flow 36 is then allowed to exit the apparatus 10 into solid waste stream 224 depicted in FIG. 7. The control module 82 may then instruct the actuator 80 to close the restrictor gate 78 until the desired pressure, weight, or similar is reached again upon buildup of material in the waste stream flow 36. In one or more embodiments, the control module 82 may be configured to instruct the actuator 80 to actuate the restrictor gate at about 40 pounds per square inch of pressure.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A waste separator apparatus comprising:
   a first screen assembly for screening fluids from a waste stream, the first screen assembly defining an enclosure;
   a second screen assembly for screening fluids from the waste stream and being disposed closely spaced-apart within the enclosure of the first screen assembly;
   a waste stream pathway defined between the first screen assembly and the second screen assembly;
   a first separated fluids stream pathway defined outwardly of the first screen assembly;
   a second separated fluids stream pathway defined inwardly of the second screen assembly; and
   one or more blades extending inwardly from the first screen assembly or outwardly from the second screen assembly for advancing the waste stream upwardly through the waste stream pathway.

2. The waste separator apparatus according to claim 1, further comprising a housing for enclosing the first screen assembly and the second screen assembly.

3. The waste separator apparatus according to claim 1, further comprising a pump for pumping the waste stream to the waste separator apparatus.

4. The waste separator apparatus according to claim 3, wherein the pump is a progressive cavity pump.

5. The waste separator apparatus according to claim 1, wherein:
the first screen assembly is cylindrically shaped and having a diameter of about 11 inches, and
the second screen assembly is cylindrically shaped and having a diameter of about 8 inches,
further wherein the first screen assembly and the second screen assembly are coaxially aligned.

6. The waste separator apparatus according to claim 1, further including a vacuum source in communication with at least one of the first separated fluids stream pathway and the second separated fluids stream pathway.

7. The waste separator apparatus according to claim 1, wherein the one or more blades comprises an auger blade that defines a helical plane extending from about a bottom portion of the second screen assembly to about a top portion of the second screen assembly.

8. The waste separator apparatus according to claim 7, wherein the auger blade further comprises a sealing layer on a peripheral surface thereof for maintaining engagement with the first screen assembly.

9. The waste separator apparatus according to claim 1, further including at least one device configured for rotating at least one of the first screen assembly and the second screen assembly.

10. The waste separator apparatus according to claim 1, wherein the first screen assembly and the second screen assembly defines a wedge wire mesh having about a twenty-thousandths clearance.

11. The waste separator apparatus according to claim 1, further including a conveyor at a top portion in communication with the waste stream pathway for conveying separated waste away from the apparatus.

12. The waste separator apparatus according to claim 1, further including a flow restriction apparatus about a top portion of the waste stream pathway for restricting flow-through until a desired parameter is reached.

13. A system for treating a waste fluid stream, the system comprising:
a waste site having the waste fluid stream output;
a waste separator apparatus configured for separating the waste fluid stream into respective separated fluid streams, the waste separator apparatus comprising:
a first screen assembly for screening fluids from a waste stream, the first screen assembly defining an enclosure;
a second screen assembly for screening fluids from the waste stream and being disposed closely spaced-apart within the enclosure of the first screen assembly;
a waste stream pathway defined between the first screen assembly and the second screen assembly;
a first separated fluids stream pathway defined outwardly of the first screen assembly;
a second separated fluids stream pathway defined inwardly of the second screen assembly; and
one or more blades extending inwardly from the first screen assembly or outwardly from the second screen assembly for advancing the waste stream upwardly through the waste stream pathway; and
a downstream processing unit configured for further processing of one of the separated fluid streams.

14. The system according to claim 13, further comprising a homogenization tank between the waste site and the waste separator apparatus.

15. The system according to claim 13, further comprising one of a denitrification and a nitrification unit in communication with the system.

16. The system according to claim 13, wherein the waste site is a livestock farm.

17. The system according to claim 13, further comprising a lagoon for storing separated liquids.

18. The system according to claim 13, wherein the apparatus further includes a housing for enclosing the first screen assembly and the second screen assembly.

19. The system according to claim 13, further comprising a pump for pumping the waste stream to the waste separator apparatus.

20. The system according to claim 19, wherein the pump is a progressive cavity pump.

21. The system according to claim 13, wherein:
the first screen assembly is cylindrically shaped and having a diameter of about 11 inches, and
the second screen assembly is cylindrically shaped and having a diameter of about 8 inches,
further wherein the first screen assembly and the second screen assembly are coaxially aligned.

22. The system according to claim 13, wherein the separator apparatus further includes a vacuum source in communication with at least one of the first separated fluids stream pathway and the second separated fluids stream pathway.

23. The system according to claim 13, wherein the one or more blades comprises an auger blade that defines a helical plane extending from about a bottom portion of the second screen assembly to about a top portion of the second screen assembly.

24. The system according to claim 23, wherein the auger blade further comprises a guide surface on a peripheral surface thereof for maintaining engagement with the first screen assembly.

25. The system according to claim 13, wherein the apparatus further includes at least one device configured for rotating at least one of the first screen assembly and the second screen assembly.

26. The system according to claim 13, wherein the first screen assembly and the second screen assembly defines a wedge wire mesh having about a twenty-thousandths clearance.

27. The system according to claim 13, further including a conveyor at a top portion in communication with the waste stream pathway for conveying separated waste away from the apparatus.

28. The system according to claim 13, wherein the waste separator apparatus further including a flow restriction apparatus about a top portion of the waste stream pathway for restricting flow-through until a desired parameter is reached.

* * * * *